(12) United States Patent
Sjoo

(10) Patent No.: US 10,099,304 B2
(45) Date of Patent: Oct. 16, 2018

(54) MILLING TOOL AND A TOOL BODY

(71) Applicant: SANDVIK INTELLECTUAL PROPERTY AB, Sandviken (SE)

(72) Inventor: Sture Sjoo, Gavle (SE)

(73) Assignee: SANDVIK INTELLECTUAL PROPERTY INC, Sandviken (SE)

( * ) Notice: Subject to any disclaimer, the term of this patent is extended or adjusted under 35 U.S.C. 154(b) by 175 days.

(21) Appl. No.: 14/703,947

(22) Filed: May 5, 2015

(65) Prior Publication Data
US 2015/0321276 A1 Nov. 12, 2015

(30) Foreign Application Priority Data

May 6, 2014 (EP) ..................................... 14167187

(51) Int. Cl.
*B23F 21/16* (2006.01)
(52) U.S. Cl.
CPC ....... *B23F 21/166* (2013.01); *Y10T 407/1715* (2015.01); *Y10T 407/1725* (2015.01)
(58) Field of Classification Search
CPC .. B23F 21/166; B23F 21/16; Y10T 407/1715; Y10T 407/1725
See application file for complete search history.

(56) References Cited

U.S. PATENT DOCUMENTS

| | | | | |
|---|---|---|---|---|
| 688,098 A | * | 12/1901 | Knappe | B23F 21/166 407/25 |
| 1,430,485 A | * | 9/1922 | Zimmermann | B23F 11/00 407/23 |
| 1,648,470 A | * | 11/1927 | Anderson | B23F 21/16 407/23 |
| 1,728,198 A | * | 9/1929 | Brussel | B23F 21/16 407/23 |
| 1,765,853 A | | 6/1930 | Simmons | |
| 2,881,508 A | * | 4/1959 | Lindner | B23F 21/166 407/26 |
| 3,371,396 A | | 3/1968 | Johnson | |

(Continued)

FOREIGN PATENT DOCUMENTS

| | | |
|---|---|---|
| DE | 1049195 B | 1/1959 |
| DE | 1083621 B | 6/1960 |
| EP | 2508288 A2 | 10/2012 |

(Continued)

*Primary Examiner* — Alan Snyder
(74) *Attorney, Agent, or Firm* — Corinne R. Gorski

(57) ABSTRACT

A milling tool includes a tool body having a peripheral surface and a central rotation axis. A number of cutting teeth protrude from the peripheral surface, a front end set of the cutting teeth arranged along a front end portion of an imaginary helix concentric with the central rotation axis, and a back end set along a back end portion of the helix. The cutting teeth engage the workpiece successively, starting with the foremost cutting tooth of the front end set. The back end set includes at least three along the helix adjacent cutting teeth arranged at a constant first radial distance from the central rotation axis. The front end set has at least two adjacent cutting teeth arranged at an along the helix non-constant second radial distance from the central rotation axis. The second radial distance is smaller than the first radial distance and increases successively along the helix.

11 Claims, 6 Drawing Sheets

(56) References Cited

U.S. PATENT DOCUMENTS

2012/0257935 A1* 10/2012 Sture .................... B23F 21/166
                                                                      407/51
2013/0302098 A1* 11/2013 Sjoo ...................... B23F 21/16
                                                                       407/11

FOREIGN PATENT DOCUMENTS

| EP | 2537617 | A1 | | 12/2012 | |
|----|---------|----|----|---------|--|
| EP | 2662173 | A1 | | 11/2013 | |
| GB | 794912 | A | * | 5/1958 | ............ B23F 21/166 |
| JP | S52159493 | U | | 12/1977 | |

\* cited by examiner

MILLING TOOL AND A TOOL BODY

RELATED APPLICATION DATA

This application claims priority under 35 U.S.C. § 119 to EP Patent Application No. 14167187.5, filed on May 6, 2014, which the entirety thereof is incorporated herein by reference.

TECHNICAL FIELD OF THE INVENTION

The present disclosure relates to a milling tool formed for hobbing of a workpiece having cylindrical cogs, such as gear wheels or the like, or having racks. The disclosure also relates to a tool body for such a milling tool and to a segment for such a tool body.

The milling tool may be configured for forming of cylindrical cogs either in the form of spur gears, i.e. straight cylindrical gears, or in the form of helical right-hand or helical left-hand gears. The milling tool may for this purpose be configured with either a right-hand lead or a left-hand lead.

BACKGROUND

Milling tools formed for hobbing of a workpiece are disclosed in EP2487000, EP2662173, and EP2537617.

EP2487000 discloses a milling tool formed for hobbing of a workpiece having cylindrical cogs, such as gear wheels or the like, or having racks. The milling tool comprises a tool body having a peripheral surface and two opposite ends between which a central rotation axis extends, the tool body being rotatable in a predetermined direction of rotation around the central rotation axis. The tool further comprises a number of spaced-apart cutting teeth in the form of cutting inserts protruding from the peripheral surface, each cutting tooth comprising a cutting edge and a chip surface. The cutting teeth are arranged along an imaginary helix concentric with the central rotation axis so as to engage the workpiece successively along the helix. The cutting teeth are all arranged at the same radial distance from the central rotation axis.

The milling tool disclosed in EP2487000 is a kind of milling tool whose tool length needs to be long enough to cover the chord of the workpiece, so that the cutting teeth of the tool can engage the workpiece smoothly as the workpiece rolls into engagement with the tool. Failure to meet this prerequisite, in particular for rough machining, results in large forces being exerted on the foremost cutting teeth upon engagement with the workpiece. Relatively short tools are therefore associated with high noise levels. Long tools, having several cutting teeth simultaneously engaged with the workpiece, are associated with lower noise levels but are on the other hand prone to vibrations. Moreover, the costs associated with such long tools are high, both due to large material costs and due to large service costs, for example for replacing worn cutting inserts, or, if the tool is a solid high speed steel tool, for sharpening of the cutting edges. The high service costs follow from the irregular wear on the cutting teeth of the tool. The cutting teeth of the foremost and the rearmost turns of the helix remove less material than the cutting teeth located in the middle section of the tool and are therefore less susceptible to wear. Upon replacement of worn cutting inserts, a large number of inserts need to be inspected for wear, also inserts that do not need to be replaced. Furthermore, the wear on the tool body is irregular, since the middle section, where the forces exerted on the cutting teeth during machining are larger, wears faster than the end sections. For this reason, the expensive tool body often needs to be replaced due to wear on the middle section, although the end sections are still functional.

EP2662173 and EP2537617 disclose milling tools for hobbing comprising a tool body formed from several detachably interconnected disc-shaped segments, wherein each segment comprises a number of cutting teeth. With such tools, it is possible to replace only the worn sections of the tool body and thereby prolong the life of parts of the milling tool. However, the problem with irregular wear on the cutting teeth within the tool or even within a segment persists. Short milling tools of the kind disclosed in EP2662173 and EP2537617 are also associated with the disadvantages discussed above, in particular for rough machining of a workpiece.

SUMMARY

The present disclosure aims at overcoming the problems discussed above and at providing a milling tool suitable for hobbing of a workpiece, which milling tool is less susceptible to irregular wear and which combines the advantages of a short milling tool with those of a long milling tool (e.g. lower noise).

Accordingly, a milling tool for hobbing and a tool body for such a milling tool, which are improved with respect to known milling tools and tool bodies for hobbing, is provided. Additionally, a milling tool for hobbing and a tool body for such a milling tool, which are particularly suitable for rough machining of a work piece, is provided.

According to a first aspect of the disclosure, the milling tool includes a tool body having a peripheral surface and two opposite ends between which a central rotation axis extends. The tool body is rotatable in a predetermined direction of rotation around the central rotation axis. A number of spaced apart cutting teeth protrude from the peripheral surface, each cutting tooth having a cutting edge and a chip surface. A front end set of the cutting teeth is arranged along a front end portion of an imaginary helix concentric with the central rotation axis, and a back end set of the cutting teeth is arranged along an adjacent back end portion of the helix. The cutting teeth are arranged to engage the workpiece successively along the helix, starting with the foremost cutting tooth of the front end set, wherein the back end set of cutting teeth includes at least three adjacent cutting teeth arranged at an along the helix constant first radial distance from the central rotation axis.

The milling tool has a front end set of cutting teeth including at least two along the helix adjacent cutting teeth arranged at an along the helix non-constant second radial distance from the central rotation axis, wherein the second radial distance is smaller than the first radial distance and increases successively along the helix from the foremost cutting tooth.

The milling tool is thus formed with two sets of cutting teeth, of which one front end set is arranged along a front end portion of the helix and one back end set is arranged along a back end portion of the helix. The front end set includes the foremost cutting tooth of the milling tool and the back end set preferably includes the rearmost cutting tooth of the milling tool. Along the front end portion of the helix, the cutting teeth are placed at a shorter radial distance from the central rotation axis than along the back end portion.

The radial distance from a cutting tooth to the central rotation axis is herein defined as the distance to the central rotation axis, in radial direction, from the point on the cutting edge which is furthest removed from the central rotation axis. Thus, this can be achieved either by way of varying the size of the cutting teeth along the helix or by way of varying the radial placement of cutting teeth of equal size.

The front end set of cutting teeth, engaging with the workpiece before the back end set, ensures a smooth and rapid material removal, in particular for rough machining of a workpiece. The number of cutting teeth of the front end set may vary from two to more than one complete turn of the helix depending on the intended application of the milling tool. The cutting teeth of the back end set may function as involute shaping cutting teeth giving the final shape of the cogs formed. A larger number of cutting teeth in the back end set generally contributes to a more accurate shaping of the cogs. A small number of cutting teeth in the back end set may be used when the milling tool is to be used for rough machining only, in which case another milling tool may be used for the final forming of the cogs.

Due to the successively increasing radial distance from the central rotation axis, the cutting depth increases along the helix so that each successive cutting tooth of the front end set removes more material than the foregoing cutting tooth. The forces on the foremost cutting teeth are therefore significantly reduced in comparison with short milling tools having all cutting teeth arranged at the same radial distance from the central rotation axis, thus allowing for a higher feed rate and thereby more efficient machining and higher productivity. The milling tool of the present disclosure can therefore be made relatively short, with relatively few cutting teeth. This reduces the costs of the milling tool, as well as the vibration levels upon machining in comparison with a long milling tool reaching across the chord of the workpiece.

Furthermore, due to the arrangement of the front end set of cutting teeth, the milling tool can be configured so that all cutting teeth are used more evenly in the machining of the workpiece. The milling tool therefore wears more evenly than a traditional long milling tool.

According to one embodiment of the disclosure, the second radial distance increases with a distance $\Delta d$ per cutting tooth along the helix, wherein $\Delta d$ is a function of the angular distance from the foremost cutting tooth. The distance $\Delta d$ may be a linear function or a non-linear function, such as an exponential function, of the angular distance from the foremost cutting tooth depending on the application.

According to one embodiment, the distance $\Delta d$ is constant or substantially constant for each pair of along the helix adjacent cutting teeth. In this embodiment, the front end portion of the helix can be formed as a part of a truncated conical helix. The regular increase in cutting depth contributes to a smooth machining for certain applications. The truncated conical helix is preferably formed as a truncated Archimedean conical spiral. This particular configuration ensures a smooth machining due to a small cutting depth for the first cutting teeth, increasing successively along the helix to a full cutting depth.

According to one embodiment, the distance $\Delta d$ is non-constant along the helix. The distance $\Delta d$ can in this case be either increasing or decreasing along the helix. A milling tool with a large increase in radial distance for the foremost cutting teeth and a successively decreasing distance $\Delta d$ along the helix is generally more suitable for the machining of workpieces with large diameters.

According to an embodiment, the second radial distance increases with a distance $\Delta d$ of:

$$0.02h \leq \Delta d \leq 0.1h \text{ mm}$$

per cutting tooth along the helix, wherein h is the tooth height of a cutting tooth of the back end set.

The tooth height h is herein defined as the distance, as measured in a radial direction of the tool, with which the cutting tooth protrudes from the peripheral surface of the milling tool. Tooth height h is also commonly known as the profile height.

In this embodiment, the increase in radial distance is small enough to ensure that all cutting teeth are being used in the machining of the workpiece, but still large enough to provide a sufficient gradual increase in cutting depth. A relatively large increase in radial distance, i.e. a large $\Delta d$, can be used for the machining of relatively large workpieces, while a smaller increase is preferable for machining of relatively small workpieces with a small number of cogs.

According to one embodiment, the front end portion extends along at least one complete turn of the helix. The front end set of cutting teeth is in this case arranged along at least one complete turn of the helix. This ensures smooth working since the relative increase in radial distance between successive cutting teeth can be made small. Thus, the milling tool according to this embodiment is quiet and particularly suitable for rough machining. The small relative increase in cutting depth per cutting tooth also enables increasing the feed rate, allowing for a more efficient machining.

According to another embodiment of the disclosure, the helix has a constant or substantially constant axial pitch. This contributes to high efficiency in the machining process.

According to an embodiment, the angular separation between each pair of along the helix adjacent cutting teeth is constant or substantially constant. Such a positioning of the cutting teeth contributes to a high accuracy in the machining of cogs. This is particularly advantageous for the back end set of the cutting teeth, functioning as involute shaping cutting teeth for which high accuracy is desired.

According to one embodiment, all of the cutting teeth of the back end set are arranged at the constant first radial distance from the central rotation axis. This simplifies the design of the milling tool without compromising functionality. The efficiency of the milling tool is therefore improved in this embodiment, since all cutting teeth of the back end set are used for the machining operation.

According to another embodiment, the cutting teeth are arranged along at least two complete turns of the helix. The milling tool is in this embodiment is particularly suitable for external hobbing of a workpiece. The relative extension of the front end portion and the back end portion, as well as the number of teeth in the front end set and the back end set respectively, may vary.

According to one embodiment, the cutting teeth are configured as replaceable cutting inserts. In this embodiment, the milling tool thus includes a tool body and separate detachable cutting inserts fastened by fastening means. This prolongs the service life of the milling tool, since the cutting inserts, which wear faster than the tool body, may easily be replaced. It also enables the use of different cutting inserts for different positions within the milling tool, or the use of different cutting inserts for different applications. For example, the foremost cutting inserts may for certain applications be of a different shape than the cutting inserts of the back end portion. The cutting inserts may be in the form of indexable cutting inserts, double-sided cutting inserts, or single-sided cutting inserts.

According to a further embodiment, all the cutting inserts are identical. The first end set of the cutting inserts are mounted closer to the central rotation axis than the cutting inserts of the back end set, with the foremost cutting tooth of the front end set mounted closest to the central rotation axis. The radial distance is thus varied only by means of placement of the cutting inserts. This simplifies the cutting insert mounting and replacement process for the end user of the milling tool.

According to a second aspect, a tool body for a milling tool formed for hobbing of a workpiece having cylindrical cogs, such as gear wheels or the like, or having racks, includes a peripheral surface and two opposite ends between which a central rotation axis extends. The tool body is rotatable in a predetermined direction of rotation around the central rotation axis. A number of spaced-apart insert seats are arranged in the peripheral surface. A front end set of the insert seats is arranged along a front end portion of an imaginary helix concentric with the central rotation axis. A back end set of the insert seats is arranged along an adjacent back end portion of the helix. Each insert seat is arranged to receive a cutting insert such that the cutting inserts, when mounted, are arranged to engage the workpiece successively along the helix, starting with the cutting insert mounted in the foremost insert seat of the front end set.

Each insert seat includes a stopping means for fixing the respective cutting insert in a radial direction, wherein the back end set of insert seats includes at least three along the helix adjacent insert seats with their respective stopping means arranged at an along the helix constant first radial distance from the central rotation axis. The tool body is characterized in that the front end set of insert seats has at least two along the helix adjacent insert seats with their respective stopping means arranged at an along the helix non-constant second radial distance from the central rotation axis, wherein the second radial distance is smaller than the first radial distance and increases successively along the helix from the foremost insert seat.

Such a tool body is configured for use in a milling tool according to any of the embodiments described herein. Advantages associated with such a tool body thus correspond to the advantages discussed above. The stopping means used to fix the cutting inserts in the radial direction may be in the form of a stopping surface, in which case the stopping surface is preferably normal to the radial direction of the tool body and extends in parallel with the central rotation axis. Another alternative is to use stopping means in the form of a male or a female stopping member which is formed for engagement with a corresponding member in the cutting insert, such as used in for example the CoroTurn TR iLock system, which is disclosed in EP2487000.

According to one embodiment of this second aspect, the second radial distance increases with a distance $\Delta d$ per insert seat along the helix, wherein $\Delta d$ is a function of the angular distance from the foremost insert seat.

According to one embodiment of the second aspect, the distance $\Delta d$ is constant or substantially constant for each pair of along the helix adjacent insert seats. The front end portion of the helix may, in this case, be formed as a part of a truncated conical helix. The truncated conical helix is preferably formed as a truncated Archimedean conical spiral.

According to one embodiment of the second aspect, the distance $\Delta d$ is non-constant along the helix.

According to one embodiment of the second aspect, the front end portion of the helix extends along at least one complete turn of the helix.

According to one embodiment of the second aspect, the helix has a constant or substantially constant axial pitch.

According to one embodiment of the disclosure, the angular separation between each pair of along the helix adjacent insert seats is constant or substantially constant.

According to one embodiment, all the insert seats of the back end set have stopping means arranged at said constant first radial distance from the central rotation axis.

According to a further embodiment of the tool body, the insert seats are arranged along at least two complete turns of the helix.

Advantages associated with the above mentioned embodiments of the tool body correspond to advantages discussed above for the corresponding milling tool.

According to another embodiment of the second aspect of the disclosure, the tool body includes at least two detachably interconnected disc-shaped segments, each segment including a hub part having two opposite plane-parallel end surfaces extending perpendicularly to the central rotation axis, a peripheral cam configured to receive at least two spaced-apart cutting inserts, and interconnection means for interconnecting the segment with a neighbouring segment. Interconnection means for interconnecting segments of such a segmented tool body may be such as disclosed in EP2662173 and EP2537617. In this embodiment, one or more segment or segments of the tool body may include the front end set of cutting teeth, while the other segment or segments may include the back end set of teeth. Thus, the configuration of the tool may easily be modified depending on the machining application.

According to a third aspect of the disclosure, the disclosure relates to a segment for the tool body described above, which is characterized in that the segment includes at least a part of the front end set of insert seats. One or more of such segments, depending on the design of the segments, may be combined with one or more other segment or segments, each including at least a part of the back end set of insert seats. A very versatile tool may be achieved using the segment according to the disclosure.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

FIGS. 1-6 schematically show a milling tool 1 according to a first embodiment of the disclosure, configured for the formation of external cylindrical cogs in a workpiece 30 by means of so-called hobbing. The milling tool 1 is fixed in a tool spindle 2 of a milling machine or a multi-operation machine and is rotatable around a central rotation axis C1 in a direction of rotation R1. The workpiece 30 is fixed in a workpiece spindle 31 and is rotatable around a central rotation axis C2 in a direction of rotation R2, which is such that the milling tool 1 and the workpiece 30 respectively rotate as the worm and the worm gear of a worm drive. The milling tool 1 is movable with respect to the workpiece 30 in a direction of movement Z parallel with the central rotation axis C2 of the workpiece 30. For the sake of clarity, the workpiece 30 is shown with finished cogs, i.e., in a finished machined state.

Figure 4:
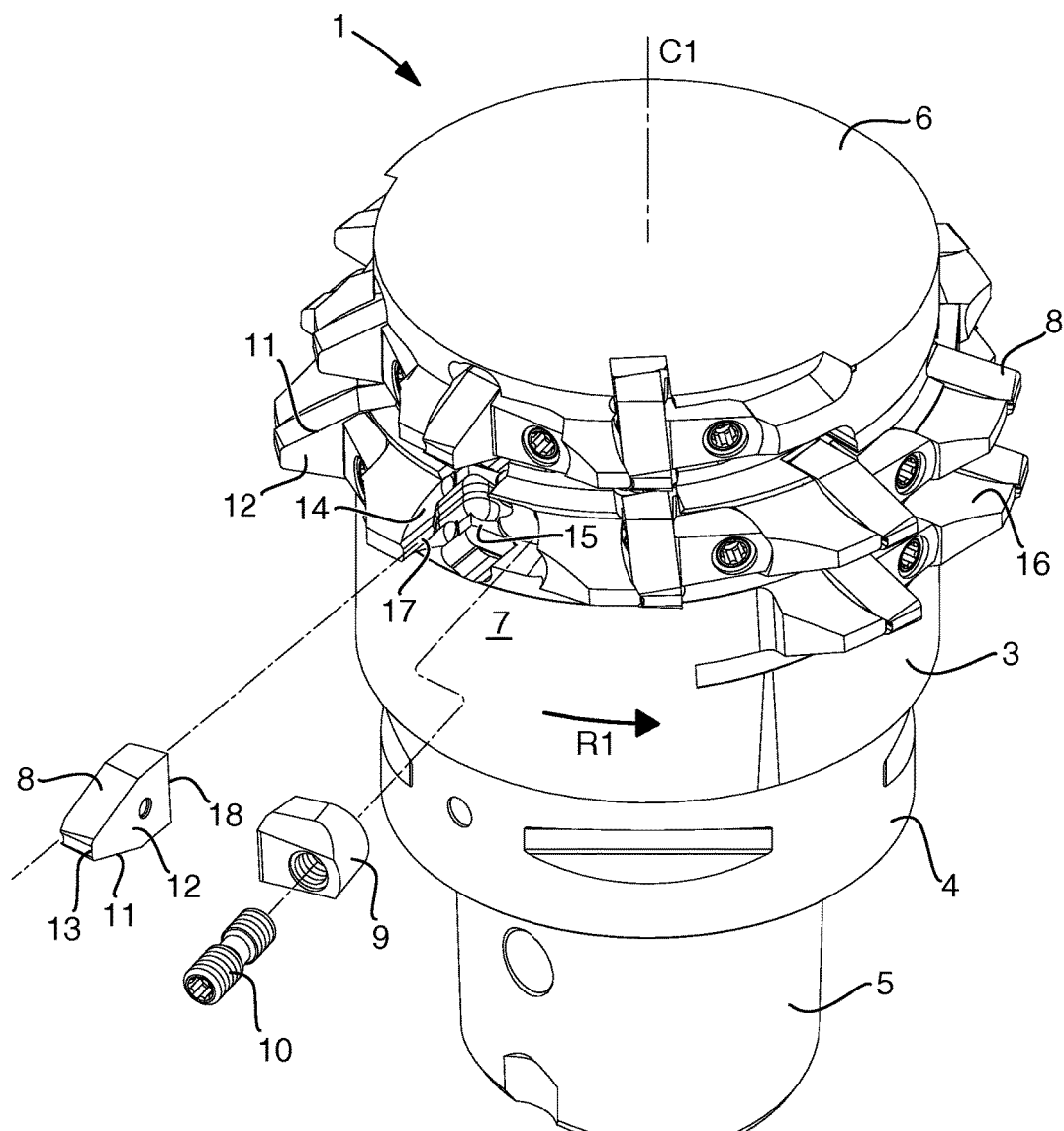
FIG. 4 is a perspective view of the milling tool in FIG. 1.

As shown in FIG. 4, the milling tool includes a tool body 3 with two ends, in this embodiment a fixing end 4 with a fixing part 5 in the form of a Coromant Capto® part, which is fixed in the tool spindle 2, and an opposite outer end 6. A peripheral surface 7 extends around the central rotation axis C1 between the outer end 6 and the fixing end 4. A number of spaced-apart cutting teeth are arranged in the form of identical cutting inserts 8 securely mounted in insert seats 14 of the tool body 3 by means of clamps 9, fastened by screws 10 in the tool body 3.

Figure 7:
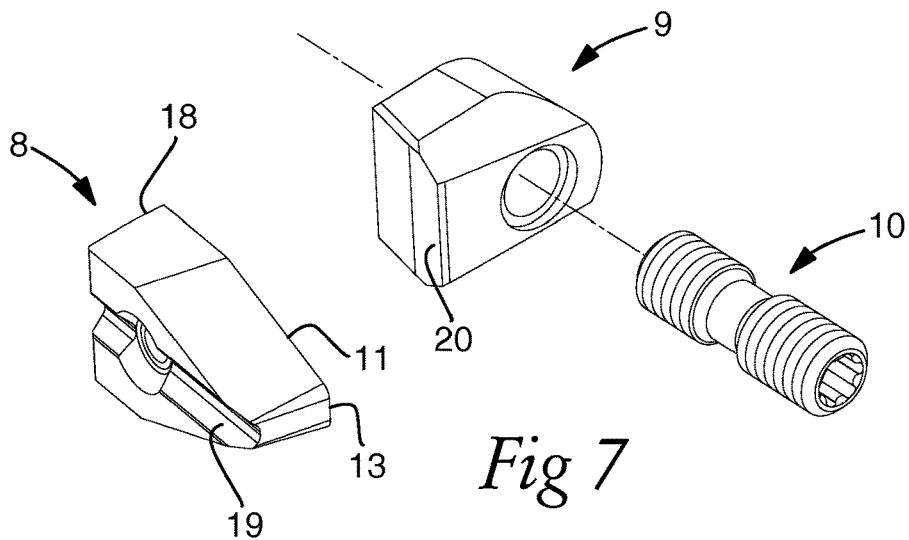
FIG. 7 is a perspective view of a milling insert and fastening means used in the milling tool in FIG. 1.

Each cutting insert 8, shown in greater detail in FIG. 7, includes a cutting edge 11 and a chip surface 12, which faces forward as seen in the direction of rotation R1 of the milling tool 1. The cutting inserts 8 are mounted along two turns of an imaginary helix with a lead angle β and are arranged to engage the workpiece 30 successively along the helix, starting with a foremost cutting insert 8a. The lead angle β is here 2.9°, but may typically vary between 0.5° and 10°, more specifically between 1° and 5° depending on the diameter of the milling tool, wherein tools with large diameters are typically configured with relatively small lead angles. The distance along the helix between two adjacent cutting inserts 8 is equal for each pair of adjacent cutting inserts 8, and thus also the angular separation a between two adjacent cutting inserts 8. The angular separation a is here 40°, but may vary between 18° and 60°. In the shown embodiment, the milling tool 1 is configured with a right-hand lead and is suitable for the external hobbing of spur gears and right hand helical gears.

The cutting inserts 8 are arranged as a front end set, here comprising eight cutting inserts 8a-8h, and a back end set, here comprising 10 cutting inserts 8i. The cutting inserts 8a-8h of the front end set are arranged along a front end portion of an imaginary helix concentric with the central rotation axis C1. The front end portion is herein defined as the portion of the helix that includes the cutting insert 8a which first engages with the workpiece 30.

In the shown embodiment, where the milling tool 1 is configured with a right-hand lead, the front end portion of the helix is the portion closest to the outer end 6 of the tool body 3. The angular distance from the foremost cutting insert 8a of the front end set to the last cutting insert 8h of the front end set is here 280°. The cutting inserts 8i of the back end set are arranged along a back end portion of the helix, which is adjacent the front end portion. Here, the back end set of cutting inserts 8i starts at an angular distance of 320° from the foremost cutting insert 8a of the front end set. The cutting inserts 8i of the back end set are all arranged at a first radial distance r1 from the central rotation axis C1, wherein the radial distance is defined as the distance from the central rotation axis C1 to an outermost portion 13 of the cutting edge 11. The first radial distance r1 is constant along the helix, so that the cutting inserts 8i are all arranged with their respective cutting edges 11 at the same distance from the central rotation axis C1.

Figure 5:
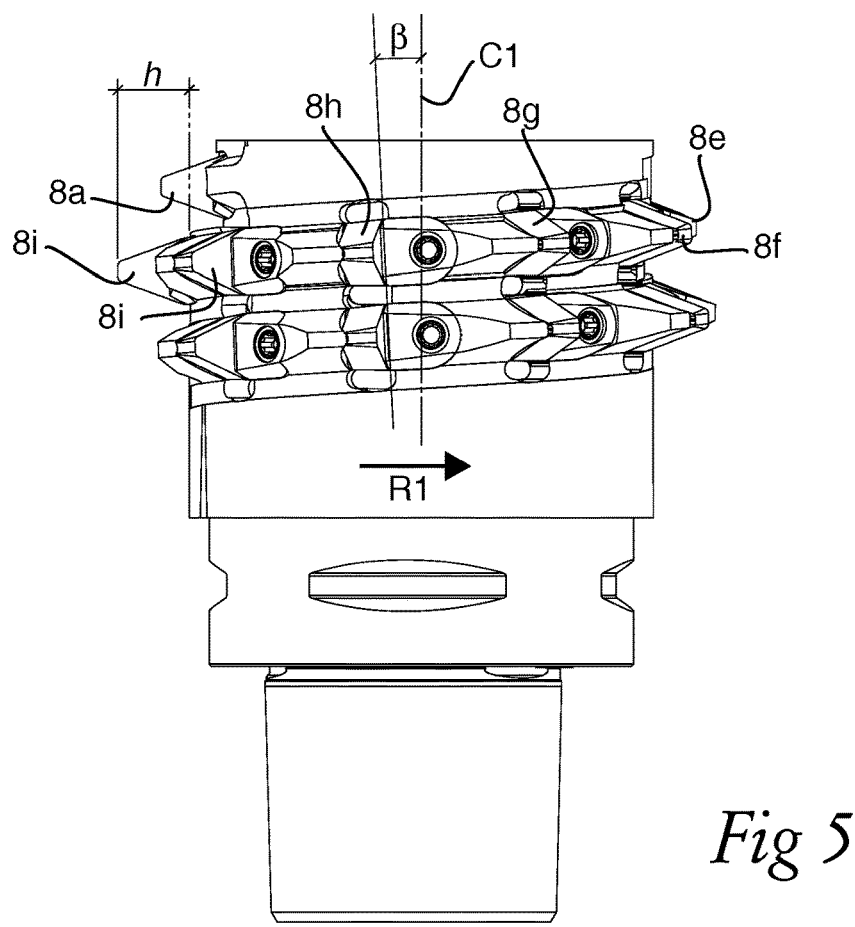
FIG. 5 is a side view of the milling tool in FIG. 1.
Figure 6:
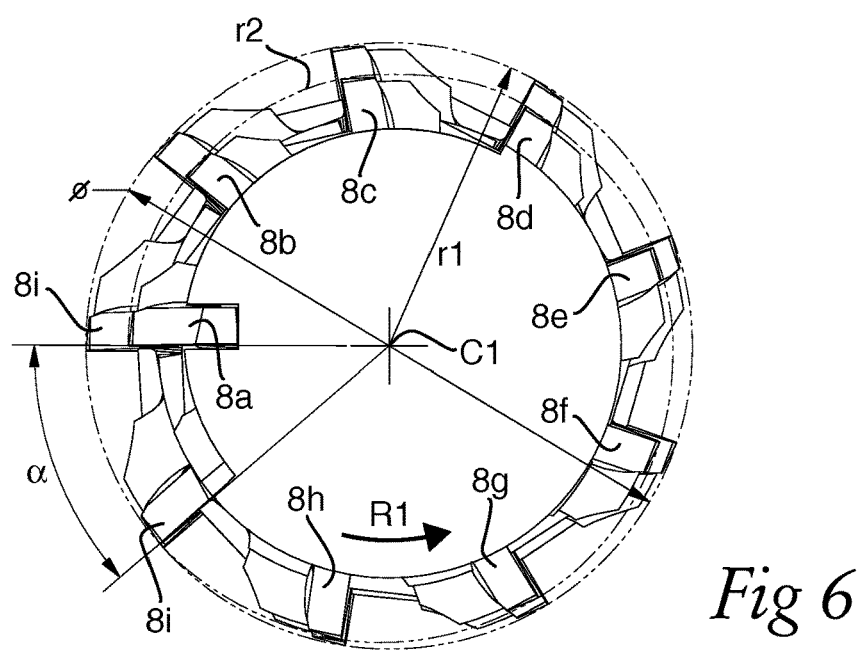
FIG. 6 is a top view of the milling tool in FIG. 1.

The cutting inserts 8a-8h of the front end set are arranged at an along the helix non-constant second radial distance r2 from the central rotation axis C1. The second radial distance r2, in FIG. 6 marked as a spiral line, is smaller than the first radial distance r1 and increases successively along the helix from the foremost cutting insert 8a. In the shown embodiment, the front end portion of the helix is formed as a truncated conical helix, and more specifically as a truncated Archimedean conical spiral, wherein the helix is truncated at the outer end 6 of the milling tool 1. The milling tool 1 here has a diameter φ of 90 mm and the first radial distance r1 is thus 45 mm. The second radial distance r2 increases gradually with a constant distance Δd=0.8 mm per cutting insert 8a-8h, from 38.6 mm for the foremost cutting insert 8a to 44.2 mm for the last cutting insert 8h of the front end set. As shown in FIG. 5, the cutting inserts 8i of the back end set have a tooth height h of 9.8 mm, which is herein defined as the distance, as measured in a radial direction of the tool, with which the cutting tooth protrudes from the peripheral surface 7 of the milling tool 1. Thus, in this embodiment Δd=0.08 h.

Figure 8:
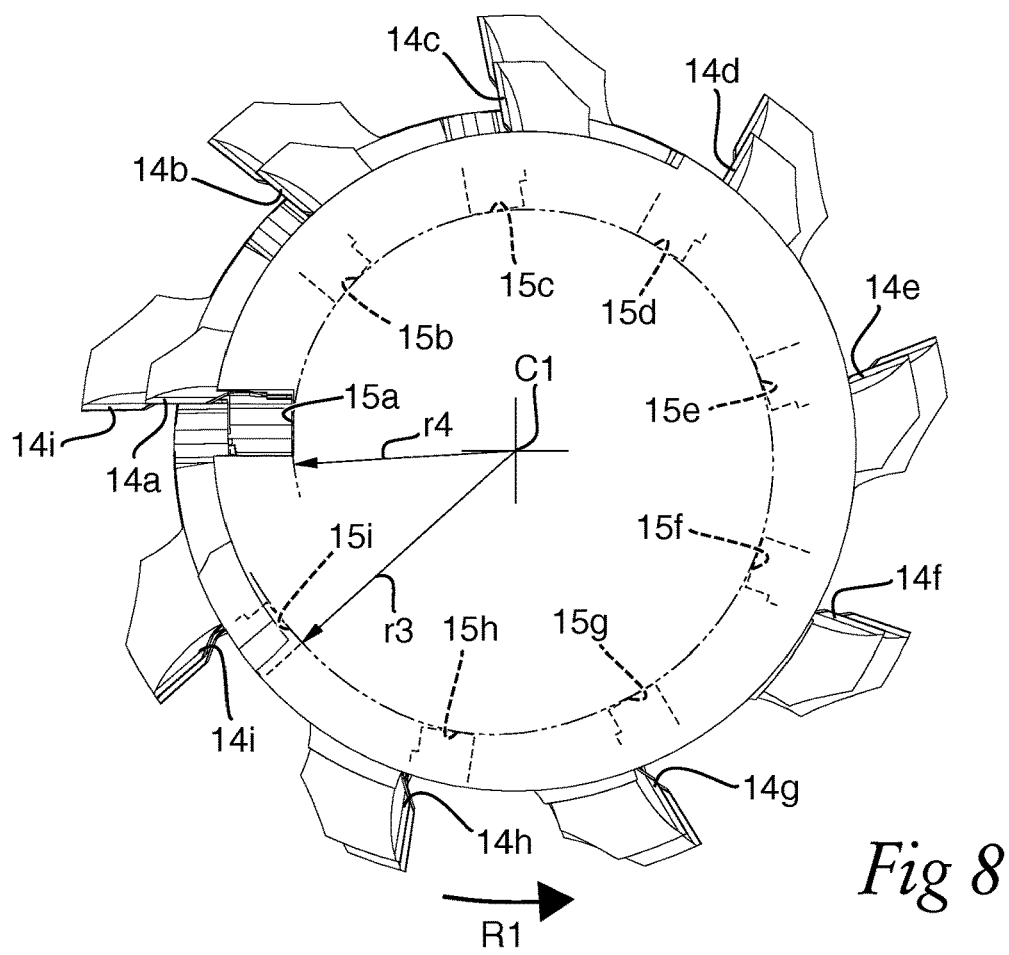
FIG. 8 is an end view of a tool body according to another embodiment of the disclosure.

The tool body 3 is shown in FIG. 8 without the cutting inserts mounted. The tool body 3 includes a number of spaced-apart insert seats 14 arranged in the peripheral surface 7 along an imaginary helix concentric with the central rotation axis C1. A front end set of the insert seats 14 includes eight insert seats 14a-14h arranged along a front end portion of the helix, and a back end set of the insert seats 14 includes ten insert seats 14i arranged along an adjacent back end portion of the helix. Each insert seat 14 is arranged to receive a cutting insert 8 such that the cutting inserts 8, when mounted, are arranged to engage the workpiece 30 successively along the helix, starting with the cutting insert 8a mounted in the foremost insert seat 14a of the front end set.

Each insert seat 14 includes stopping means in the form of a stopping surface 15 for preventing the cutting insert 8 mounted in the insert seat 14 from moving in a radial direction of the tool body 3 toward the central rotation axis C1. The stopping surface 15 is for this purpose is arranged normal to the radial direction of the tool body 3 and extends in parallel with the central rotation axis C1. Each stopping surface 15 is arranged closer to the central rotation axis C1 than the peripheral surface 7, so that a pocket is formed in the tool body 3 for receiving the cutting insert 8. The insert seats 14i of the back end set have their respective stopping surfaces 15i arranged at a first radial distance r3 from the central rotation axis C1, which first radial distance r3 is constant along the helix. All stopping surfaces 15i of the back end set are thus arranged at the same distance from the central rotation axis C1.

The insert seats 14a-14h of the front end set have their respective stopping surfaces 15a-15h arranged at, along the helix, a non-constant second radial distance r4 from the central rotation axis C1, in FIG. 8 shown as a spiral line. The second radial distance r4 is smaller than the first radial distance r3 and increases successively along the helix from the foremost insert seat 14a.

In the shown embodiment, the front end portion of the helix is formed as a truncated conical helix, and more specifically as a truncated Archimedean conical spiral. In the shown embodiment, the increase in radial distance per insert seat 14a-14h corresponds to the increase in radial distance per cutting insert 8a-8h as described above for the milling tool 1. In other words, the radial distance r2 of the milling tool 1 comprising the tool body 3 in the present embodiment is varied by means of varying the radial distance r4 of the tool body 3.

Each insert seat 14 further includes a protuberance 16 protruding from the peripheral surface 7 of the tool body 3 and forming a support structure rotationally behind the cutting insert 8. In the protuberance 16, a locking ridge 17 is formed.

FIG. 7 shows a cutting insert 8, a clamp 9 and a screw 10 used in the milling tool 1 according to the shown embodiment. The cutting insert 8 is in this embodiment formed as a single-sided cutting insert. The cutting insert 8 includes a support surface 18 for resting on the radial stopping surface 15 of the tool body 3. A groove 19 is formed for engagement with the locking ridge 17. The cutting insert 8 is secured in the insert seat 14 by the clamp 9 and the screw 10. When mounted, a pressing surface 20 of the clamp 9 presses against an extension of the chip surface 12 of the cutting insert 8, which is thereby secured in the insert seat 14. The cutting insert, when mounted, projects radially from the tool body 3 past the protuberance 16 for cutting engagement with the workpiece 30.

Figure 1:
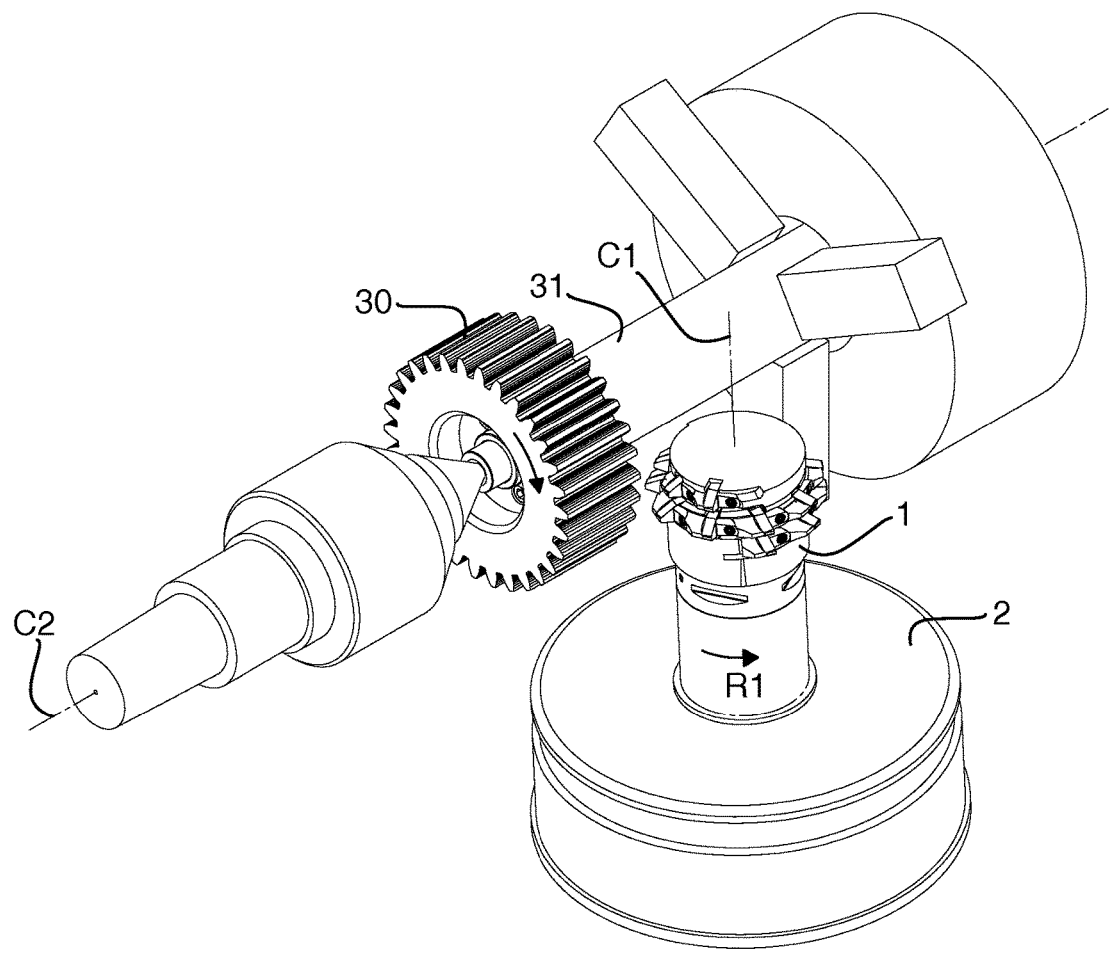
FIG. 1 is a perspective view of a milling tool according to a first embodiment of the disclosure together with a work piece.
Figure 2:
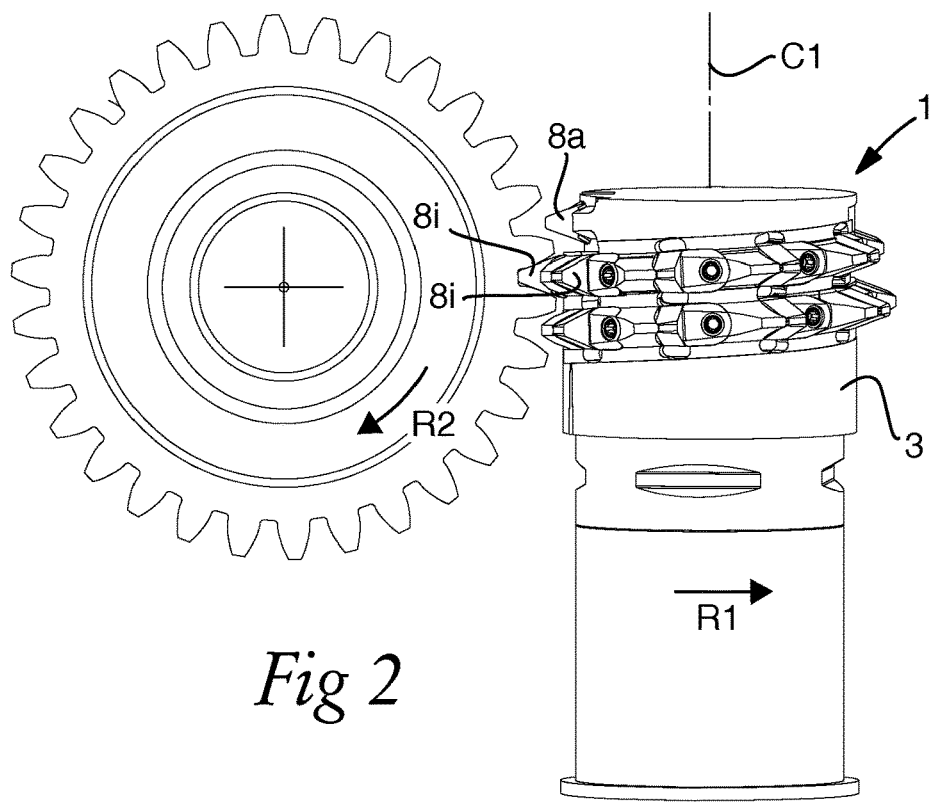
FIG. 2 is a side view of the milling tool in FIG. 1 in engagement with the work piece.
Figure 3:
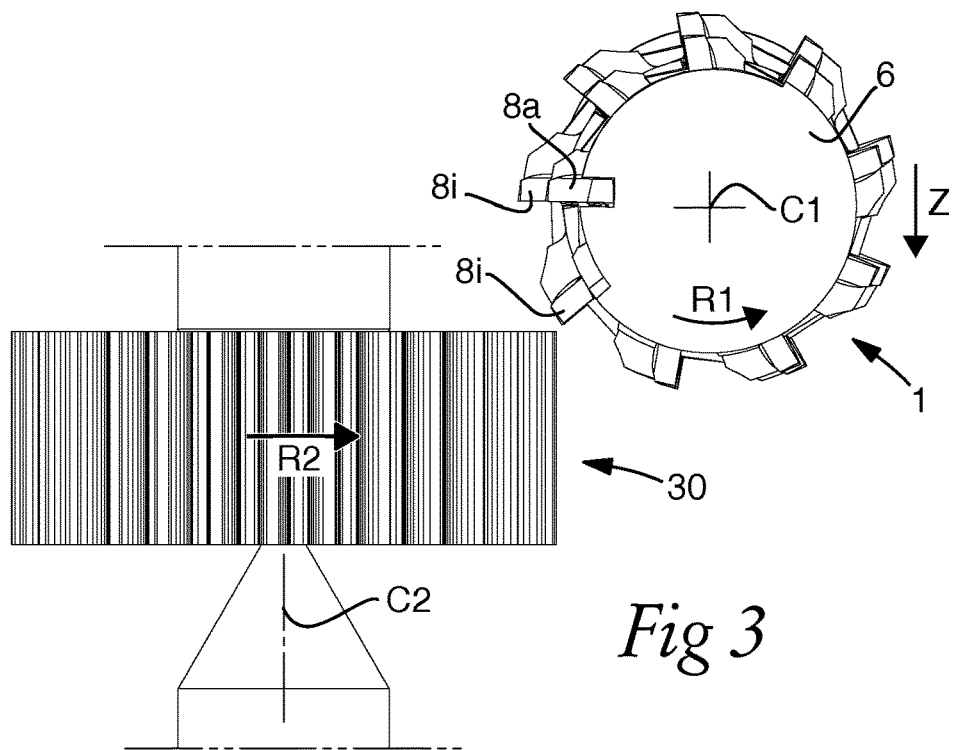
FIG. 3 is an end view of the milling tool in FIG. 1 before engagement with the work piece.

In a machining process, as shown in FIG. 1-3, the milling tool 1 is set to rotate at high speed in the direction of rotation R1. The workpiece 30 is set to rotate at a considerably lower speed in the direction of rotation R2, which is chosen such that the milling tool 1 first engages the workpiece 30 with the foremost cutting insert 8a, thereafter with the cutting insert 8b, etc. Each cutting insert 8 thereby removes material from the workpiece 30. For the milling of spur gears, the central rotation axis C1 of the milling tool 1 is tilted with respect to the direction of rotation R2 of the workpiece 30 with an angle corresponding to the lead angle β of the helix. The milling tool 30 is fed in the direction Z with respect to the workpiece 30 and cogs are thereby formed in the workpiece. The front end set of cutting inserts 8a-8h, engaging the workpiece 30 before the back end set of cutting inserts 8i, performs rough machining and preforming of cogs. The cutting inserts 8i of the back end set provide the cogs with their final involute shape.

Figure 9:
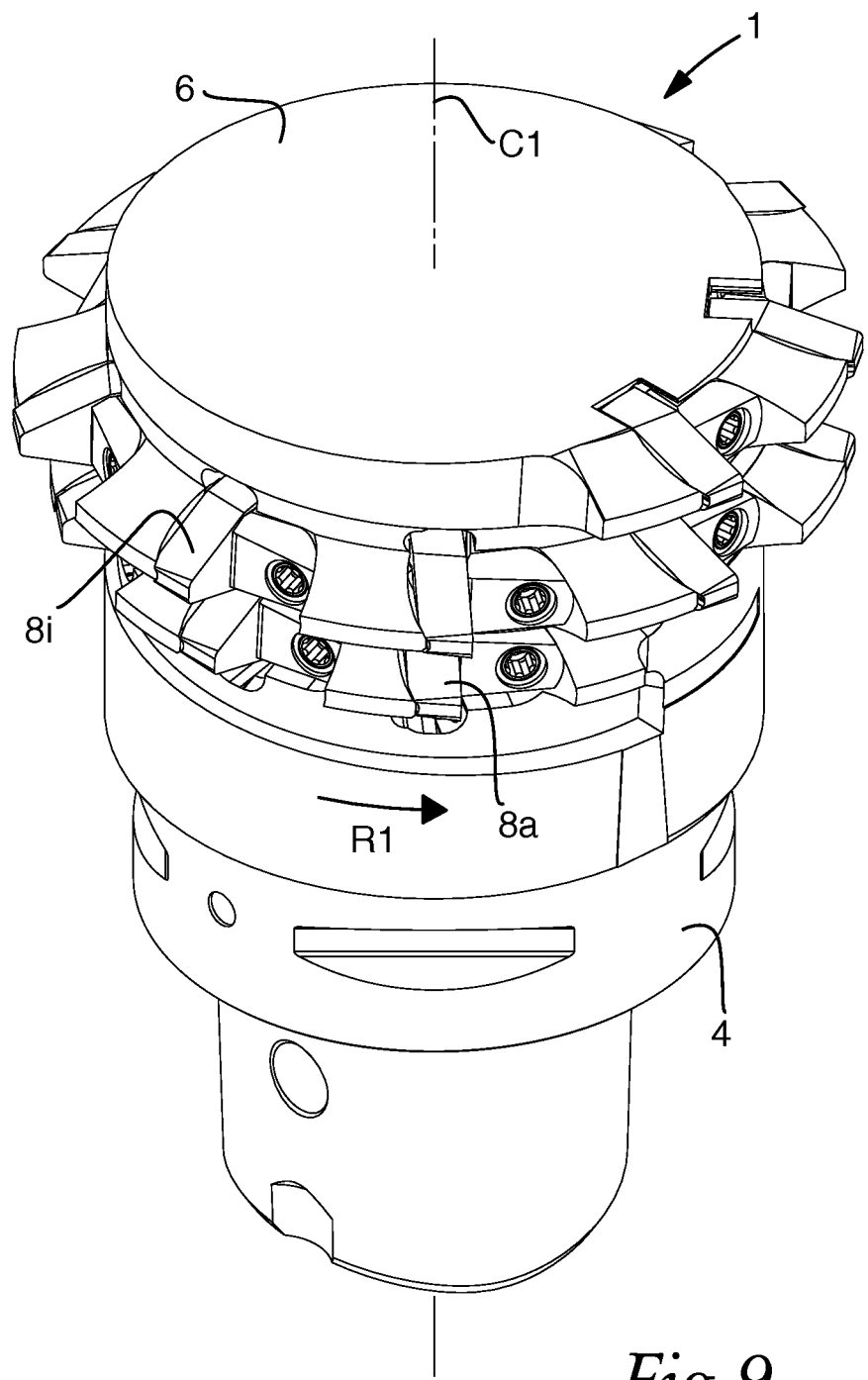
FIG. 9 schematically is a perspective view of a milling tool according to a second embodiment of the disclosure.

FIG. 9 schematically shows a milling tool 1 according to a second embodiment of the disclosure. The milling tool 1 in this embodiment only differs from the milling tool 1 in the first embodiment in that it is configured with a left-hand lead. The foremost cutting insert 8a, located at the smallest radial distance from the central rotation axis C1, is thereby located closest to the fixing end 4 of the milling tool 1. The cutting inserts 8i of the back end set are located closer to the outer end 6 of the milling tool 1. When in use, the direction of rotation of a workpiece with which the milling tool 1 is to engage, should be such that the foremost cutting insert 8a engages the workpiece first. In comparison with the first embodiment, the rotation of the workpiece should be reversed. The milling tool 1 is in this embodiment suitable for hobbing of spur gears, in which case the milling tool has to be tilted with respect to the direction of rotation of the workpiece, and left hand helical gears.

The disclosure is not limited to the embodiments disclosed, but may be varied and modified. For instance, other kinds of cutting inserts may be used, such as indexable cutting inserts of the kind disclosed in EP2487000. Also other means of fastening the cutting inserts may be used, such as screws. It is also possible to vary the second radial distance r2 at least in part by means of the design of the cutting inserts. For instance, at least some of the front end set of cutting inserts may be smaller than the rest of the cutting inserts, and/or have a cutting edge with a larger radius of curvature.

It is also possible to vary the number of cutting teeth in the front end set as well as in the back end set, the diameter of the tool and the number of cutting teeth per turn of the helix. The increase in the second radial distance within the front end set between along the helix adjacent cutting teeth, or in the case of the tool body, between along the helix adjacent insert seats, does not need to be equal along the helix, but may vary along the helix.

It should be appreciated that the milling tool may also be in the form of a milling tool with non-replaceable cutting teeth integrated with the tool body, such as a solid high speed steel tool. In that case, the non-constant second radial distance within the front end set of cutting teeth may be varied by means of the design of the cutting teeth or by means of placement of the cutting teeth with respect to a peripheral surface of the tool.

The milling tool described above is in the form of a single-thread milling tool, i.e. a milling tool with cutting teeth arranged along a single helix line. However, it is also possible to configure the milling tool according to the disclosure as a double-thread or even as a triple-thread milling tool, in which cases the lead angle of the milling tool is increased in comparison with a corresponding single thread milling tool.

The milling tool may also at its outer end include means for coupling the milling tool to e.g. a bearing bracket, for providing support in both ends of the milling tool, such as described in EP2662173 and EP2537617.

Although the present embodiments have been described in relation to particular aspects thereof, many other variations and modifications and other uses will become apparent to those skilled in the art. It is preferred therefore, that the present embodiments be limited not by the specific disclosure herein, but only by the appended claims.

The invention claimed is:

1. A milling tool for hobbing of a workpiece having cylindrical cogs, comprising:
    a tool body having a peripheral surface and two opposite ends between which a central rotation axis extends, the tool body being rotatable in a predetermined direction of rotation around the central rotation axis; and
    a number of spaced-apart cutting teeth protruding from the peripheral surface, each cutting tooth having a cutting edge and a chip surface, a front end set of said cutting teeth being arranged along a front end portion of an imaginary helix concentric with the central rotation axis, and a back end set of said cutting teeth being arranged along an adjacent back end portion of said helix, the cutting teeth being arranged to engage the workpiece successively along the helix, starting with a foremost cutting tooth of the front end set, wherein the back end set of cutting teeth includes at least three along the helix adjacent cutting teeth being arranged at an along the helix constant first radial distance from the central rotation axis, wherein the front end set of cutting teeth includes at least two along the helix adjacent cutting teeth arranged at an along the helix non-constant second radial distance from the central rotation axis, the second radial distance being smaller than the first radial distance and increasing successively along the helix from the foremost cutting tooth, wherein the second radial distance increases with a distance $\Delta d$ of 0.02 h≤$\Delta d$≤0.1h mm per cutting tooth along the helix, wherein h is the tooth height of a cutting tooth of the back end set, the cutting teeth being configured as replaceable inserts and wherein all said cutting inserts are identical, the front end portion extending along less than one complete turn of the helix.

2. The milling tool according to claim 1, wherein the second radial distance increases with a distance $\Delta d$ per cutting tooth along the helix, wherein $\Delta d$ is a function of an angular distance from the foremost cutting tooth.

3. The milling tool according to claim 2, wherein the distance $\Delta d$ is constant or substantially constant for each pair of along the helix adjacent cutting teeth.

4. The milling tool according to claim 2, wherein the distance $\Delta d$ is non-constant along the helix.

5. The milling tool according to claim 2, wherein an angular separation between each pair of along the helix adjacent cutting teeth is constant or substantially constant.

6. The milling tool according to claim 1, wherein the helix has a constant or substantially constant axial pitch.

7. The milling tool according to claim 1, wherein all cutting teeth of the back end set are arranged at said constant first radial distance from the central rotation axis.

8. The milling tool according to claim 1, wherein the cutting teeth are arranged along less than two complete turns of the helix.

9. A tool body for a milling tool formed for hobbing of a workpiece having cylindrical cogs, the tool body comprising:
  a peripheral surface and two opposite ends between which a central rotation axis extends, the tool body being rotatable in a predetermined direction of rotation around the central rotation axis;
  a number of spaced-apart insert seats arranged in the peripheral surface, a front end set of said insert seats being arranged along a front end portion of an imaginary helix concentric with the central rotation axis, and a back end set of said insert seats being arranged along an adjacent back end portion of said helix, each insert seat being arranged to receive a replaceable cutting insert such that identical cutting inserts, when mounted, are arranged to engage the workpiece successively along the helix, starting with the cutting insert mounted in a foremost insert seat of the front end set, wherein each insert seat includes stopping means for fixing the respective cutting insert in a radial direction, wherein the back end set of insert seats includes at least three along the helix adjacent insert seats with respective stopping means arranged at an along the helix constant first radial distance from the central rotation axis, and wherein the front end set of insert seats includes at least two along the helix adjacent insert seats with respective stopping means arranged at an along the helix non-constant second radial distance from the central rotation axis, the second radial distance being smaller than the first radial distance and increasing successively along the helix from the foremost insert seat, wherein the second radial distance increases with a distance $\Delta d$ of 0.02 h≤$\Delta d$≤0.1h mm per cutting tooth along the helix, wherein h is the tooth height of a cutting tooth of the back end set, the front end portion extending along less than one complete turn of the helix.

10. The tool body according to claim 9, wherein the front end portion of the helix is formed as a part of a truncated conical helix.

11. The tool body according to claim 9, further comprising at least two detachably interconnected disc-shaped segments, each segment including a hub part having two opposite plane-parallel end surfaces extending perpendicularly to the central rotation axis, a peripheral cam configured to receive at least two spaced-apart cutting inserts, and interconnection means for interconnecting the segment with a neighbouring segment.

* * * * *